United States Patent
Kawagoshi

(10) Patent No.: US 8,198,879 B2
(45) Date of Patent: Jun. 12, 2012

(54) BOOSTER CIRCUIT AND PWM SIGNAL GENERATOR

(75) Inventor: Hirokazu Kawagoshi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 347 days.

(21) Appl. No.: 12/654,800

(22) Filed: Jan. 5, 2010

(65) Prior Publication Data

US 2010/0181978 A1    Jul. 22, 2010

(30) Foreign Application Priority Data

Jan. 19, 2009   (JP) ................................ 2009-008377

(51) Int. Cl.
*G05F 1/40*   (2006.01)

(52) U.S. Cl. ........................................ 323/282

(58) Field of Classification Search .................. 323/280, 323/282–285, 288, 289, 351
See application file for complete search history.

(56) References Cited

U.S. PATENT DOCUMENTS

| | | | | |
|---|---|---|---|---|
| 5,519,598 A | * | 5/1996 | Sakai et al. | 363/20 |
| 5,995,819 A | * | 11/1999 | Yamaji et al. | 455/326 |
| 6,369,558 B2 | * | 4/2002 | Umemoto | 323/282 |
| 7,965,071 B2 | * | 6/2011 | Saitoh | 323/288 |
| 8,058,853 B2 | * | 11/2011 | Murota | 323/267 |
| 2001/0054885 A1 | * | 12/2001 | Umemoto | 323/282 |
| 2003/0076053 A1 | * | 4/2003 | Kambara et al. | 315/224 |

FOREIGN PATENT DOCUMENTS

JP    2004-96967    3/2004

* cited by examiner

*Primary Examiner* — Adolf Berhane
(74) *Attorney, Agent, or Firm* — McGinn IP Law Group, PLLC

(57) ABSTRACT

A PWM signal generator used for a booster circuit including a voltage-boosting coil that is connected to a main power supply, and a driving transistor that drives the voltage-boosting coil to generate boosted voltage, the PWM signal generator including a first amplifier that generates intermediate voltage based on a voltage value of the boosted voltage, a triangular wave generator that generates a triangular wave signal, a comparator that compares a voltage level of the intermediate voltage with a voltage level of the triangle wave signal to generate an intermediate PWM signal, a driver that generates a PWM signal supplied to the driving transistor based on the intermediate PWM signal, and a second amplifier that generates a driver power supply supplied to the driver based on magnitude of a voltage value of the intermediate voltage.

7 Claims, 5 Drawing Sheets

BOOSTER CIRCUIT AND PWM SIGNAL GENERATOR

BACKGROUND

1. Field of the Invention

The present invention relates to a booster circuit and a PWM signal generator, and more particularly, to a booster circuit and a PWM signal generator that control a control state of a driving transistor in accordance with magnitude of load current that flows in a load circuit connected to a booster circuit.

2. Description of Related Art

Booster circuits are able to generate voltage that is higher than an input voltage (for example, voltage of main power supply). One of the booster circuits includes a booster circuit of coil boosting type. The booster circuit of coil boosting type includes a driving transistor where conduction state is controlled by a PWM signal, and a voltage-boosting coil that is connected between a main power supply and the driving transistor. The booster circuit drives the voltage-boosting coil by the driving transistor to generate the boosted voltage.

In recent years, a duty ratio of the PWM signal that drives the driving transistor is controlled in accordance with the magnitude of load current consumed in a load circuit connected to a booster circuit in order to decrease power consumption of the booster circuit. For example, when the load current is large, the duty ratio of the PWM signal is increased to make the time that the driving transistor is conducted longer to sufficiently provide large load current. On the other hand, when the load current is small, the duty ratio of the PWM signal is decreased to make the time that the driving transistor is conducted shorter to reduce power consumption.

However, in a control terminal (gate terminal, for example) of the driving transistor, an input parasitic capacity is formed. Thus, when the PWM signal is supplied to the driving transistor, current to charge the input parasitic capacity to the voltage value in accordance with the amplitude is required regardless of the duty ratio of the PWM signal. Typically, the input parasitic capacity of the driving transistor used in the booster circuit has a large capacitance, which requires larger volume of current for charging. Thus, there is a problem that the power consumption cannot sufficiently be reduced in the booster circuit due to the charge current to the input parasitic capacity even when the duty ratio is decreased. To deal with this problem, a technique of reducing power consumption when the load current is small is disclosed in Japanese Unexamined Patent Application Publication No. 2004-96967.

FIG. 5 shows a circuit diagram of a booster circuit 100 disclosed in Japanese Unexamined Patent Application Publication No. 2004-96967. As shown in FIG. 5, in the booster circuit 100, an internal power supply circuit 115 varies the voltage value of an internal power supply Vcc according to the current that flows in a driving transistor 103. Then, a driver 113 drives the driving transistor 103 by a PWM signal having amplitude in accordance with the voltage value of an internal power supply Vcc. As such, the booster circuit 100 is able to drive the driving transistor 103 by the PWM signal having small amplitude when the load current is small. In other words, the booster circuit 100 is able to reduce charging and discharging current of the driving transistor 103 to an input parasitic capacity Ciss when the load current is small, so as to reduce the power consumption when the load is small.

SUMMARY

However, the present inventors have found the problem as follows. In the booster circuit 100, a transformer 128 is employed to generate the internal power supply Vcc. Transformers typically have a large mounting area. Further, transformers cannot be embedded in semiconductor devices. In portable equipments or the like, element mounting area is limited, and thus the element that requires large mounting area such as transformers cannot be mounted.

A first exemplary aspect of an embodiment of the present invention is a PWM signal generator used for a booster circuit including a voltage-boosting coil that is connected to a main power supply, and a driving transistor that drives the voltage-boosting coil to generate boosted voltage, the PWM signal generator including a first amplifier that generates intermediate voltage based on a voltage value of the boosted voltage, a triangular wave generator that generates a triangular wave signal, a comparator that compares a voltage level of the intermediate voltage with a voltage level of the triangle wave signal to generate an intermediate PWM signal, a driver that generates a PWM signal supplied to the driving transistor based on the intermediate PWM signal, and a second amplifier that generates a driver power supply supplied to the driver based on magnitude of a voltage value of the intermediate voltage.

A second exemplary aspect of an embodiment of the present invention is a booster circuit including a voltage-boosting coil that is connected to a main power supply, a driving transistor that drives the voltage-boosting coil to generate boosted voltage, an amplifier that generates intermediate voltage based on a voltage value of the boosted voltage, a triangular wave generator that generates a triangular wave signal, a comparator that compares a voltage level of the intermediate voltage with a voltage level of the triangle wave signal to generate an intermediate PWM signal, a driver that generates a PWM signal supplied to the driving transistor based on the intermediate PWM signal, and a driver power supply generator that generates a driver power supply supplied to the driver based on magnitude of a voltage value of the intermediate voltage.

According to the booster circuit and the PWM signal generator of the present invention, the voltage value of the driver power supply supplied to the driver can be generated by the second amplifier. Now, the second amplifier can be mounted in one semiconductor device. Accordingly, in the booster circuit and the PWM signal generator according to the present invention, a region of transformer can be provided in the driver without separately providing the driver power supply, thereby reducing the circuit mounting area.

According to the booster circuit and PWM signal generator of the present invention, it is possible to realize the booster circuit and PWM signal generator with small mounting area and low power consumption.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 1:
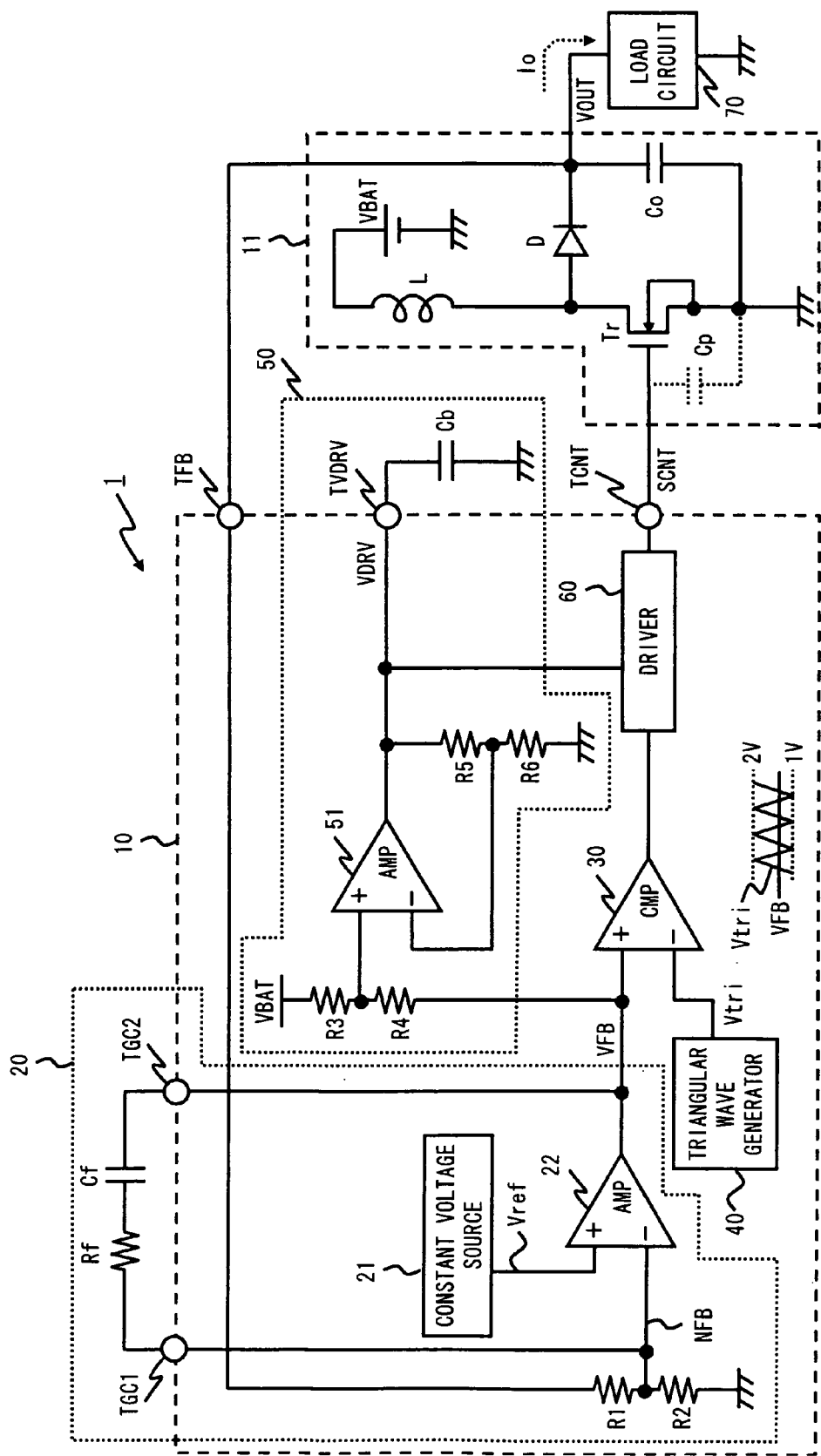
FIG. 1 shows a circuit diagram of a booster circuit according to a first exemplary embodiment.

Hereinafter, the exemplary embodiments of the present invention will be described with reference to the drawings. FIG. 1 shows a circuit diagram of a booster circuit 1 according to the first exemplary embodiment. As shown in FIG. 1, the booster circuit 1 includes a PWM signal generator 10 and an output circuit 11. In the following description, the PWM signal generator 10 is formed as one semiconductor device, and the output circuit 11 is separately provided from the PWM signal generator 10.

The PWM signal generator 10 controls pulse width and amplitude of a PWM signal SCNT output according to variation of load current Io that flows in a load circuit 70. In the first exemplary embodiment, the PWM signal generator 10 includes a first amplifier 20, a comparator 30, a triangular wave generator 40, a second amplifier 50 (for example, a driver power supply generator), and a driver 60.

The first amplifier 20 generates intermediate voltage VFB whose voltage level varies depending on variation of boosted voltage Vout. The first amplifier 20 includes a constant voltage source 21, an amplifier 22, resistors R1, R2, Rf, and a capacitor Cf. The constant voltage source 21 generates reference voltage Vref whose voltage value is set in advance. The resistors R1, R2 are connected in series between a feedback terminal TFB and a ground terminal. A connection node NFB between the resistor R1 and the resistor R2 is connected to an inverting terminal of the amplifier 22. A non-inverting terminal of the amplifier 22 is connected to the constant voltage source 21. Further, the inverting terminal of the amplifier 22 is connected to a terminal TGC1, and an output terminal of the amplifier 22 is connected to a terminal TGC2. Between the terminal TGC1 and the terminal TGC2, the resistor Rf and the capacitor Cf are connected in series. Further, the amplifier 22 amplifies voltage difference between a second divided voltage obtained by dividing the boosted voltage Vout by the resistors R1, R2 and the reference voltage Vref to output the intermediate voltage VFB. Note that the resistor Rf and the capacitor Cf may be embedded in the PWM signal generator 10.

The triangular wave generator 40 generates a triangular wave signal Vtri. In the first exemplary embodiment, the triangular wave signal Vtri has a highest voltage value of 2 V, a lowest voltage value of 1 V, and a certain cycle. The comparator 30 has a non-inverting terminal to which the output of the first amplifier 20 is connected, and an inverting terminal to which the output of the triangular wave generator 40 is connected. Further, the comparator 30 compares the voltage level of the triangular wave signal Vtri with the voltage level of the intermediate voltage VFB to output an intermediate PWM signal. This intermediate PWM signal is a pulse signal whose duty ratio varies according to the variation of the voltage level of intermediate voltage VRB.

The second amplifier 50 varies the voltage value of the driver power supply VDRV supplied to the driver 60 according to the voltage level of the intermediate voltage VFB. The second amplifier 50 includes resistors R3 to R6, a capacitor Cb, and an amplifier 51. The resistors R3, R4 are connected in series between the node in which the intermediate voltage VFB is transmitted and a main power supply VBAT. Then, the connection node between the resistor R3 and the resistor R4 is connected to a non-inverting terminal of the amplifier 51. The resistor R5 and the resistor R6 are connected in series between the output of the amplifier 51 and the ground terminal. Then, the connection node between the resistor R5 and the resistor R6 is connected to an inverting terminal of the amplifier 51. The output of the amplifier 51 is connected to a terminal TVDRV. Between the terminal TVDRV and the ground terminal, a capacitor Cb is connected. In summary, the amplifier 51 amplifies a first divided voltage obtained by dividing the voltage values of the main power supply VBAT and the intermediate voltage VFB by the resistors R3 and R4 by a certain amplification ratio determined by the resistors R5 and R6 to generate the driver power supply VDRV. At this time, the capacitor Cf functions as a stabilizing capacitor of the driver power supply VDRV. Note that the capacitor Cf may be embedded in the PWM signal generator 10.

The driver 60 outputs a signal obtained by shifting the level of the amplitude of the intermediate PWM signal output from the comparator 30 to the amplitude in accordance with the voltage value of the driver power supply VDRV as a PWM signal SCNT. Note that the output of the driver 60 is connected to a terminal TCNT.

The output circuit 11 generates the boosted voltage Vout according to the PWM signal SCNT output from the PWM signal generator 10. The output circuit 11 includes a driving transistor Tr, a voltage-boosting coil L, a main power supply VBAT, a diode D, and a smoothing capacitor Co. The driving transistor Tr is an NMOS transistor, for example. A source of the driving transistor Tr is connected to the ground terminal, a drain is connected to one end of the voltage-boosting coil L, and a control terminal (gate, for example) is connected to the output of the PWM signal generator 10. Further, an input parasitic capacity Cp is formed between the gate and the source of the driving transistor Tr.

The voltage-boosting coil L has the other end connected to a positive terminal of the main power supply VBAT. A negative terminal of the main power supply VBAT is connected to the ground terminal. An anode of the diode D is connected to the node between one end of the voltage-boosting coil L and the drain of the driving transistor Tr. A cathode of the diode D is connected to one end of the smoothing capacitor Co, the feedback terminal TFB, and the load circuit 70. The other end of the smoothing capacitor Co is connected to the ground terminal.

The output circuit 11 flows drain current from the main power supply VBAT through the voltage-boosting coil L when the PWM signal SCNT is in a high level (voltage level of driver power supply VDRV, for example) and the driving transistor Tr is in a conduction state. Subsequently, when the PWM signal SCNT is in a low level (ground voltage level, for example) and the driving transistor Tr is in an interruption state, the output circuit 11 generates the boosted voltage by the voltage-boosting coil L and stores charge in accordance with the boosted voltage Vout in the smoothing capacitor Co. The output circuit 11 repeats this operation, thereby outputting the stable boosted voltage Vout.

Further, the duty ratio of the PWM signal SCNT is increased in the booster circuit 1 when the load current Io that flows in the load circuit 70 increases in order to keep the voltage level of the boosted voltage Vout. The control of the duty ratio of the PWM signal SCNT in accordance with the voltage level of this boosted voltage Vout (or magnitude of load current Io) is performed by the PWM signal generator 10. The PWM signal generator 10 according to the first exemplary embodiment further controls the amplitude of the PWM signal SCNT in accordance with the voltage level of the boosted voltage Vout (or magnitude of load current Io). Now, the operation of the PWM signal generator 10 will be described hereinafter in detail.

Figure 2:
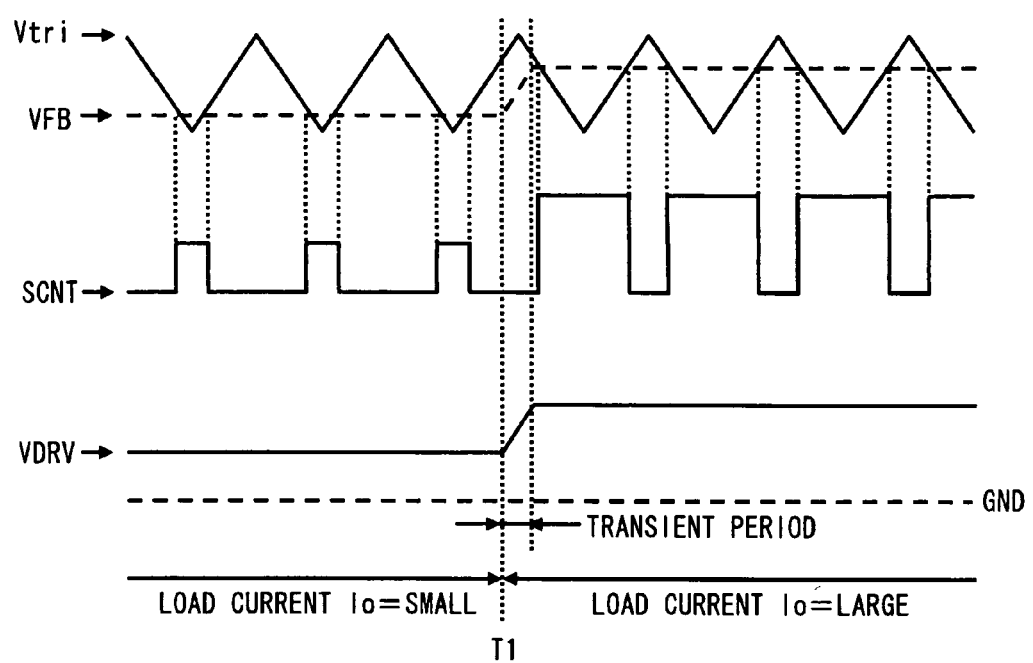
FIG. 2 shows a timing chart showing the operation of the booster circuit according to the first exemplary embodiment.

FIG. 2 shows a timing chart showing the operation of the PWM signal generator 10. As shown in FIG. 2, the PWM signal generator 10 generates PWM signal SCNT having low duty ratio and small amplitude in the period where the load current Io is small (to timing T1). On the other hand, the PWM signal generator 10 generates PWM signal SCNT having high duty ratio and large amplitude in the period where the load current Io is large (after timing T1).

In the period where the load current Io is small, the voltage level of the intermediate voltage VFB is in the voltage level that is close to the lowest voltage value of the triangular wave signal Vtri. Thus, the comparator 30 outputs the intermediate PWM signal having low duty ratio. Further, in the period where the load current Io is small, the voltage of the driver power supply VDRV also decreases in accordance with the voltage level of the intermediate voltage VFB. Thus, the driver 60 generates the PWM signal SCNT having low duty ratio and small amplitude.

Meanwhile, in the period where the load current Io is large, the voltage level of the intermediate voltage VFB is close to the highest voltage value of the triangular wave signal Vtri. Thus, the comparator 30 outputs the intermediate PWM signal having high duty ratio. Further, in the period where the load current Io is large, the voltage of the driver power supply VDRV also increases in accordance with the voltage level of the intermediate voltage VFB. Thus, the driver 60 generates the PWM signal SCNT having high duty ratio and large amplitude.

As stated above, as the PWM signal generator 10 outputs the PWM signal SCNT in accordance with the magnitude of the load current, the booster circuit 1 is able to improve power efficiency in any period of light load (a period where the load current Io is small) and heavy load (a period where the load current Io is large). For example, under light load, the charging and discharging current of the driving transistor Tr to the input parasitic capacity Cp can be reduced, thereby improving power efficiency of the booster circuit 1. Meanwhile, under heavy load, the driving transistor Tr is driven with high voltage to reduce loss in the driving transistor Tr, thereby improving power efficiency of the booster circuit 1. Note that the voltage level of the intermediate voltage VFB varies according to the switching of the magnitude of the load current, and a transient period is provided before this switching.

As will be understood from the above description, the PWM signal generator 10 according to the first exemplary embodiment generates the voltage of the driver power supply VDRV based on the voltage level of the intermediate voltage VFB used to generate the PWM signal SCNT. At this time, the PWM signal generator 10 generates the driver power supply VDRV in accordance with the voltage level of the intermediate voltage VFB by the second amplifier that does not employ transformers or the like. In summary, according to the PWM signal generator 10 of the first exemplary embodiment, a circuit that varies the driver power supply can be formed only by a circuit that can be embedded in one semiconductor device. Accordingly, the booster circuit 1 using the PWM signal generator 10 according to the first exemplary embodiment is able to realize the booster circuit having high power efficiency with small circuit size (or mounting area).

In the related booster circuit (booster circuit 100 disclosed in Japanese Unexamined Patent Application Publication No. 2004-96967, for example), a PWM controller is additionally employed to generate the internal power supply Vcc. However, the PWM signal generator 10 of the first exemplary embodiment generates the driver power supply VDRV using the intermediate voltage VFB in the circuit that generates the intermediate PWM signal supplied to the driver 60. Accordingly, there is no need to additionally provide the PWM controller in the PWM signal generator 10 according to the first exemplary embodiment. Accordingly, with the PWM signal generator 10 according to the first exemplary embodiment, the circuit size and power consumption may be reduced compared with the related booster circuit.

Second Exemplary Embodiment

Figure 3:
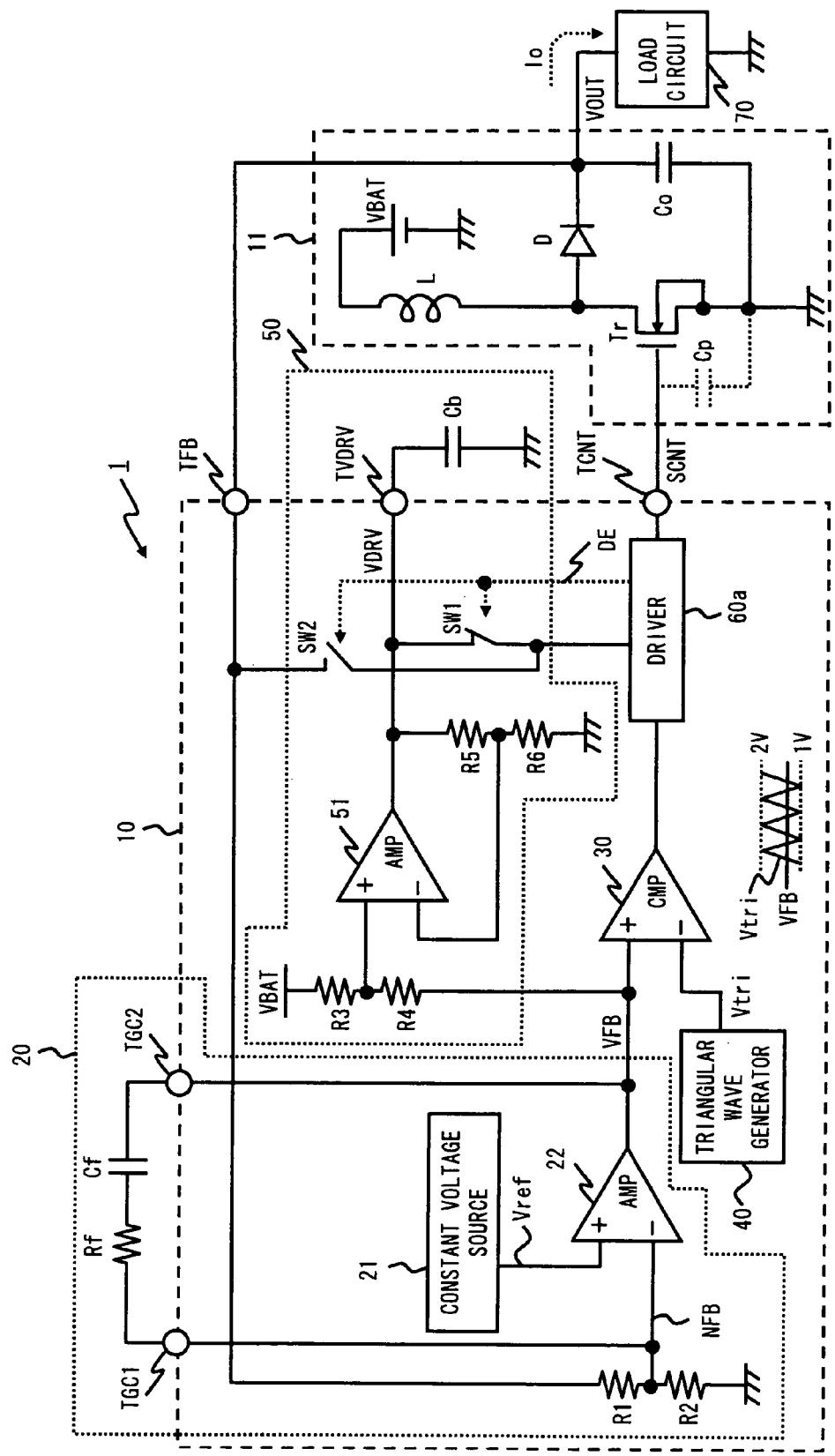
FIG. 3 shows a circuit diagram of a booster circuit according to a second exemplary embodiment.

FIG. 3 shows a circuit diagram of a booster circuit 2 according to the second exemplary embodiment. As shown in FIG. 3, the booster circuit 2 is different from the booster circuit 1 according to the first exemplary embodiment in that a first switch SW1 and a second switch SW2 are newly added, and a driver 60a is provided in place of the driver 60.

The first switch SW1 is inserted to a path that supplies driver power supply VDRV to the driver 60a. The second switch SW2 is provided between the driver 60a and the feedback terminal TFB. The driver 60a is different from the driver 60 in that a function of outputting a dead time signal DE is added to control open/close state of the first switch SW1 and the second switch SW2 depending on the duty ratio of the intermediate PWM signal output from the comparator 30.

The first switch SW1 and the second switch SW2 are switches whose open/close state is exclusively controlled based on the dead time signal DE. Further, the dead time signal DE output from the driver 60a sets the first switch SW1 to close state (for example, conduction state) when the duty ratio of the intermediate PWM signal output from the comparator 30 is smaller than the maximum value, and sets the second switch SW2 to close state when the duty ratio of the intermediate PWM signal is larger than the maximum value.

Figure 4:
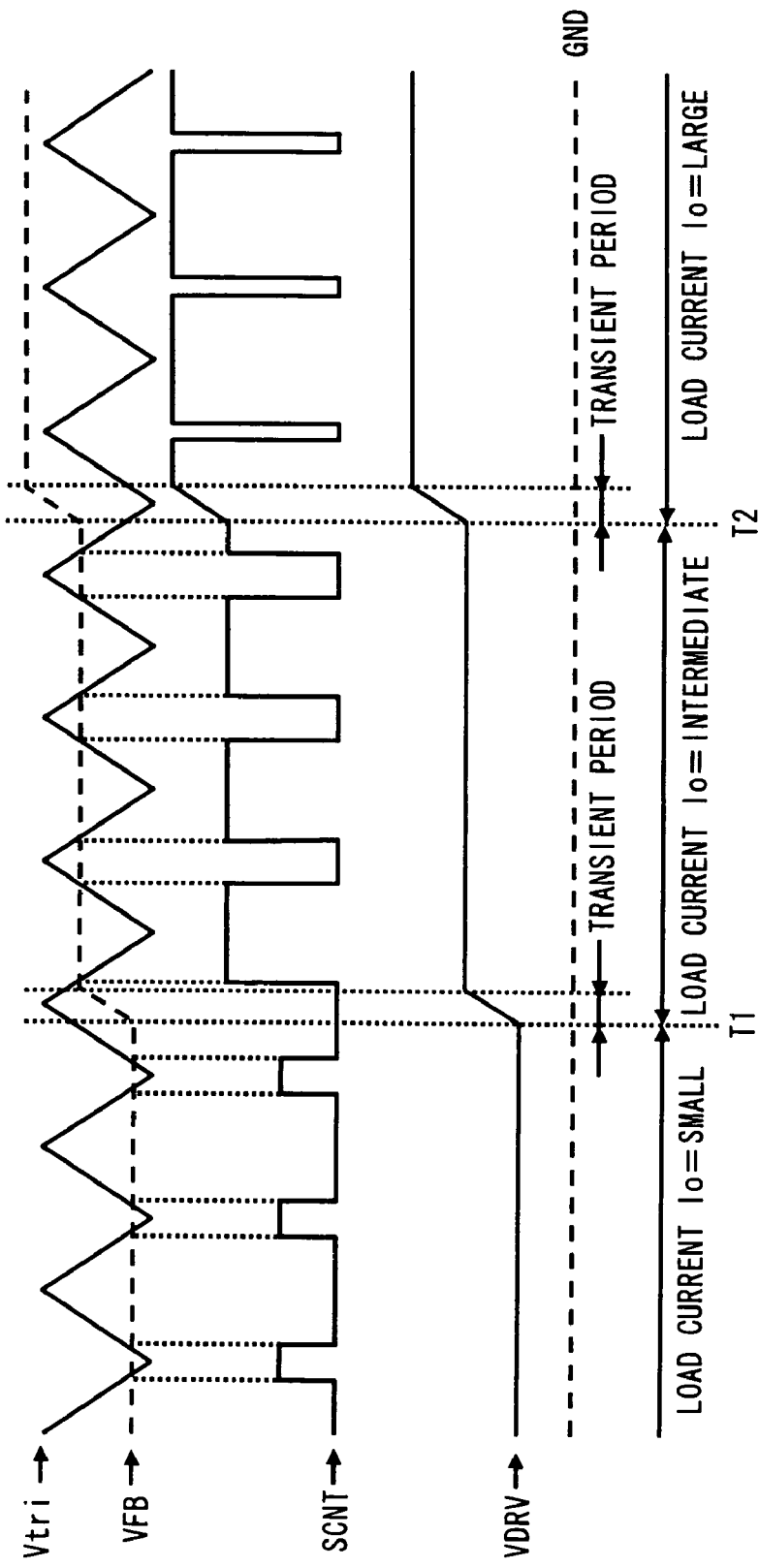
FIG. 4 shows a timing chart showing the operation of the booster circuit according to the second exemplary embodiment.
Figure 5:
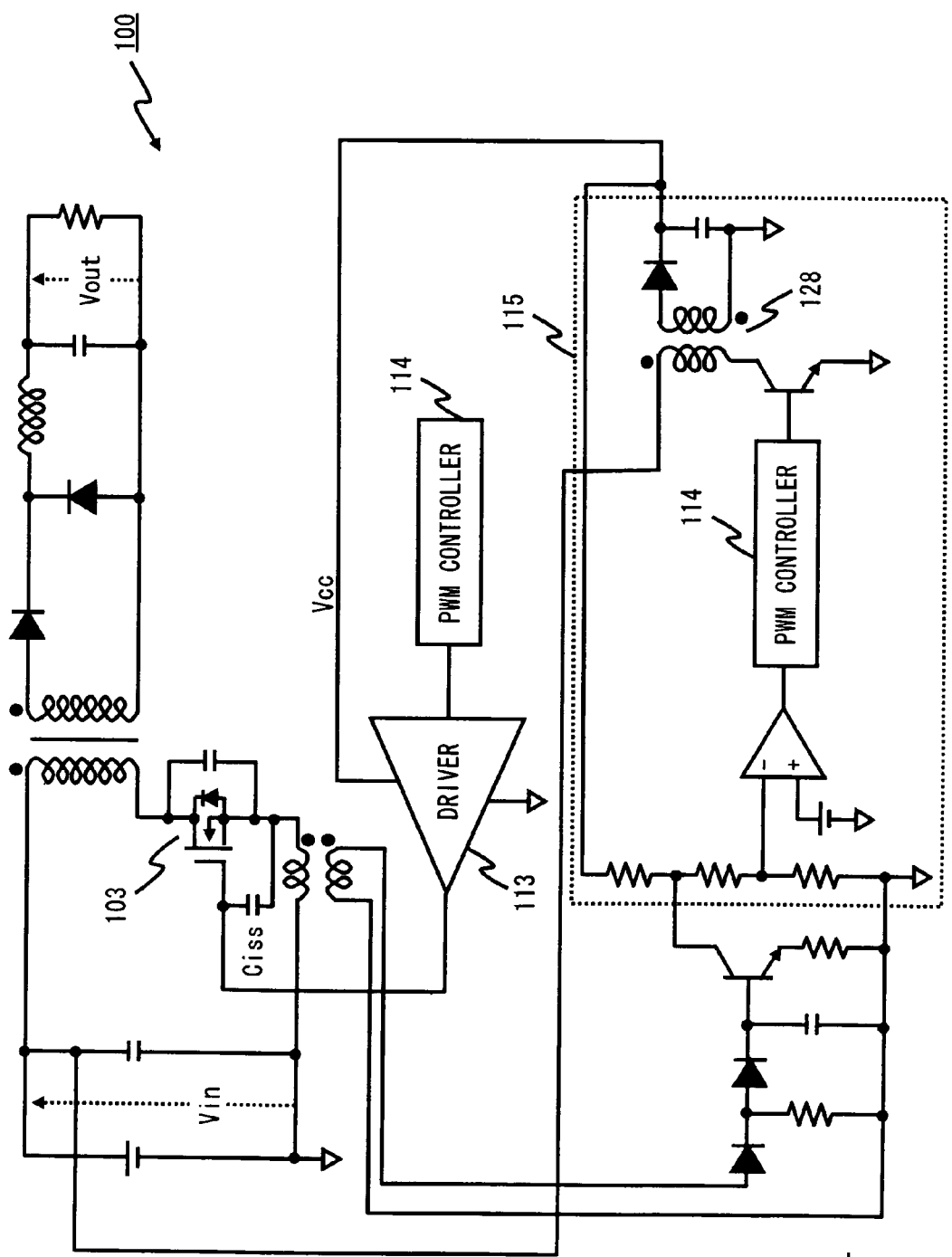
FIG. 5 shows a circuit diagram of a booster circuit according to a related art.

Now, the operation of the PWM signal generator 10 according to the second exemplary embodiment will be described. FIG. 4 is a timing chart showing the operation of the PWM signal generator 10 according to the second exemplary embodiment. Note that the period in which the load current Io is small in FIG. 4 corresponds to the period in which the load current Io is small in FIG. 2, and the period in which the load current Io is intermediate in FIG. 4 corresponds to the period in which the load current Io is large in FIG. 2. Then, the PWM signal generator 10 according to the second exemplary embodiment performs the operation of setting the second switch SW2 to close state in a period in which the load current Io is further made larger than the period of intermediate.

In the period in which the load current Io is large in FIG. 4, the voltage level of the intermediate voltage VFB is higher than the highest voltage value of the triangular wave signal Vtri. Thus, the duty ratio of the intermediate PWM signal becomes the maximum duty ratio that can be output from the comparator 30. At this time, in the PWM signal generator 10 according to the second exemplary embodiment, the first switch SW1 is set to the open state (for example, interruption state) and the second switch is set to the close state. Thus, the voltage of the power supplied to the driver 60a is equal to boosted voltage Vout.

Accordingly, the driver 60a is able to output the PWM signal SCNT having amplitude higher than a case where the load current Io is intermediate.

From the above description, according to the PWM signal generator 10 of the second exemplary embodiment, it is possible to supply the boosted voltage Vout which is larger than the maximum value of the driver power supply VDRV that can be output by the second amplifier 50 to the driver 60a when the load current Io increases. Accordingly, the booster circuit 2 according to the second exemplary embodiment is able to keep high power efficiency with respect to the variation range of the load current Io which is wider than the booster circuit 1 of the first exemplary embodiment.

The first and second exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above. For example, the second amplifier may be formed by a buffer circuit whose amplification ratio is 1.

Further, the scope of the claims is not limited by the exemplary embodiments described above.

Furthermore, it is noted that, Applicant's intent is to encompass equivalents of all claim elements, even if amended later during prosecution.

What is claimed is:

1. A PWM signal generator used for a booster circuit including a voltage-boosting coil that is connected to a main power supply, and a driving transistor that drives the voltage-boosting coil to generate boosted voltage, the PWM signal generator comprising:
   a first amplifier that generates intermediate voltage based on a voltage value of the boosted voltage;
   a triangular wave generator that generates a triangular wave signal;
   a comparator that compares a voltage level of the intermediate voltage with a voltage level of the triangle wave signal to generate an intermediate PWM signal;
   a driver that generates a PWM signal supplied to the driving transistor based on the intermediate PWM signal; and
   a second amplifier that generates a driver power supply supplied to the driver based on magnitude of a voltage value of the intermediate voltage.

2. The PWM signal generator according to claim 1, wherein the driver generates the PWM signal that sets a voltage value of the driver power supply to a maximum voltage value.

3. The PWM signal generator according to claim 1, comprising:
   a first switch that is provided between the second amplifier and the driver; and
   a second switch that is provided between the second amplifier and an output feedback line to feed back the boosted voltage to the first amplifier, the second switch and the first switch being in conduction state exclusively from each other; wherein
   the driver outputs a dead time signal to set the first switch to a conduction state when a duty ratio of the intermediate PWM signal is smaller than a maximum value and to set the second switch to a conduction state when a duty ratio of the intermediate PWM signal is larger than a maximum value.

4. The PWM signal generator according to claim 1, wherein a voltage value of the driver power supply is determined based on a first divided voltage, the first divided voltage being obtained by dividing voltage of the main power supply and the intermediate voltage by a first voltage dividing ratio.

5. The PWM signal generator according to claim 4, wherein the second amplifier amplifies the first divided voltage by a predetermined amplification ratio to generate the driver power supply.

6. The PWM signal generator according to claim 1, wherein the first amplifier amplifies a voltage difference between a second divided voltage and a constant voltage to generate the intermediate voltage, the second divided voltage being obtained by dividing the boosted voltage by a second voltage dividing ratio, the constant voltage being the voltage in which voltage value is set in advance.

7. A booster circuit comprising:
   a voltage-boosting coil that is connected to a main power supply;
   a driving transistor that drives the voltage-boosting coil to generate boosted voltage;
   an amplifier that generates intermediate voltage based on a voltage value of the boosted voltage;
   a triangular wave generator that generates a triangular wave signal;
   a comparator that compares a voltage level of the intermediate voltage with a voltage level of the triangle wave signal to generate an intermediate PWM signal;
   a driver that generates a PWM signal supplied to the driving transistor based on the intermediate PWM signal; and
   a driver power supply generator that generates a driver power supply supplied to the driver based on magnitude of a voltage value of the intermediate voltage.

* * * * *